J. PEACE & W. P. COX.
Pipe-Drilling Machines.
No. 134,307.                    Patented Dec. 24, 1872.
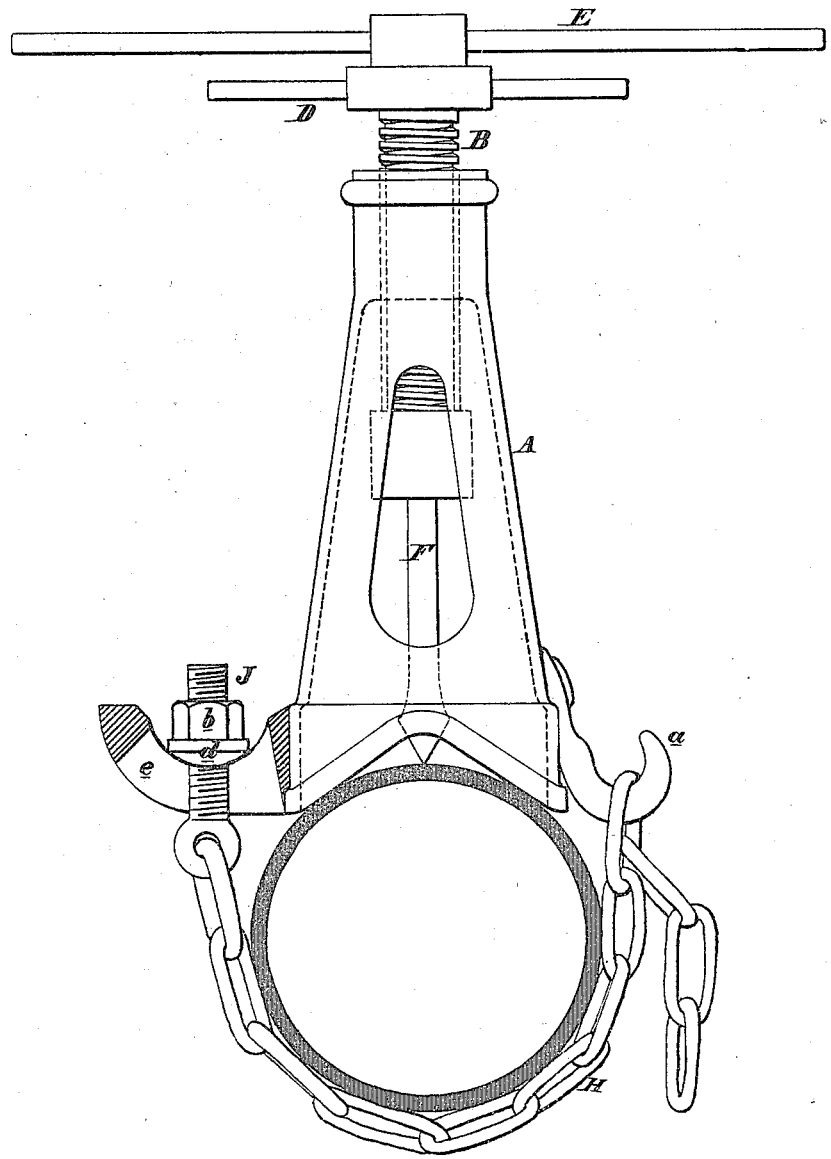

UNITED STATES PATENT OFFICE.

JOHN PEACE, OF MERCHANTVILLE, AND WILLIAM P. COX, OF CAMDEN, N. J.

IMPROVEMENT IN PIPE-DRILLING MACHINES.

Specification forming part of Letters Patent No. 134,307, dated December 24, 1872.

*To all whom it may concern:*

Be it known that we, JOHN PEACE, of Merchantville, Camden county and State of New Jersey, and WILLIAM P. COX, of city and county of Camden, State of New Jersey, have invented a Pipe-Drilling Tool, of which the following is a specification:

Our invention relates to portable tools for drilling pipes; and our improved tool, which is illustrated in the accompanying drawing, consists of a hollow cast-iron stand, A, through the top of which passes a screw, B, furnished at the top with an operating-handle, D. A drill-spindle, having at the upper end a handle, E, and at the lower end a drill, F, passes through the screw, within which it fits snugly, but so as to be turned freely, but does not admit of being moved vertically independently of the screw. The base of the stand A has a V-shaped recess, so that it can be adjusted to pipes of different diameters, and from one side of the stand near the base projects a hook, $a$, to which any one of the links of a chain, H, may be applied. One end of the chain is connected to the eye of a screw, J, which is furnished with a nut, $b$, and washer $d$, the latter being rounded on the under side and adapted to the recessed upper side of a projection, $e$, secured to or forming part of the stand A. The washer $d$ may, if desired, form a permanent part of the nut. The angle assumed by the screw J will vary in accordance with the diameter of the pipe to which the stand is adjusted, the washer $d$ accommodating itself to the varying angles.

The manner in which the stand may be securely confined to the pipe by tightening the nut $b$, and in which the chain passing under the pipe can be lengthened or shortened at pleasure by the adjustment of different links to the hook $a$, will be readily understood without explanation, as will also the operation of the drill-spindle by manipulating the handle E, and the raising or lowering of the drill by the screw B.

Claims.

1. The stand A carrying the screw B and drill-spindle, and having a hook, $a$, and projection $e$, in combination with the chain H, screw J, and its nut $b$.

2. The hollow metal stand carrying the drill, having a V-shaped recess at the base, so as to center the tool upon pipes of different diameters, as described.

In testimony whereof we have signed our names to this specification in the presence of two subscribing witnesses.

JOHN PEACE.
WILLIAM P. COX.

Witnesses:
WM. A. STEEL,
JOHN K. RUPERTUS.